United States Patent
Li

(10) Patent No.: US 10,824,007 B2
(45) Date of Patent: Nov. 3, 2020

(54) LIGHT BAR, BACKLIGHT MODULE AND LIQUID CRYSTAL DISPLAY

(71) Applicant: Huizhou China Star Optoelectronics Technology Co., Ltd., Huizhou (CN)

(72) Inventor: Jiaxin Li, Huizhou (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 249 days.

(21) Appl. No.: 15/740,243

(22) PCT Filed: Nov. 23, 2017

(86) PCT No.: PCT/CN2017/112465
§ 371 (c)(1),
(2) Date: Dec. 27, 2017

(87) PCT Pub. No.: WO2018/071732
PCT Pub. Date: Apr. 18, 2019

(65) Prior Publication Data
US 2020/0004062 A1    Jan. 2, 2020

(30) Foreign Application Priority Data

Oct. 12, 2017 (CN) .......................... 2017 1 0951922

(51) Int. Cl.
*G02F 1/13357* (2006.01)

(52) U.S. Cl.
CPC ...... *G02F 1/1336* (2013.01); *G02F 1/133603* (2013.01); *G02F 1/133605* (2013.01);
(Continued)

(58) Field of Classification Search
None
See application file for complete search history.

(56) References Cited

U.S. PATENT DOCUMENTS 9,182,086 B2 * 11/2015 Zheng .................. G02B 5/0278
2007/0057364 A1 * 3/2007 Wang ........................ C03C 8/02
257/701
(Continued)

FOREIGN PATENT DOCUMENTS

CN        2756953 Y      2/2006
CN     101078835 A     11/2007
(Continued)

OTHER PUBLICATIONS

Second Office Action from China patent office in a counterpart Chinese patent Application 201710951922.4 with English Translation, dated Oct. 8, 2019, 12 pages.

*Primary Examiner* — Ashok Patel
(74) *Attorney, Agent, or Firm* — Brinks Gilson & Lione

(57) ABSTRACT

A light bar, a backlight module and a liquid crystal display are provided. The backlight module includes the light bar and a backplane, the light bar includes a PCB, a plurality of LED chips arranged on a surface of the PCB and a protrusion arranged on the other surface of the PCB, and the backplane includes a baseboard defining a through groove. The protrusion on the PCB is inserted into the through groove of the backplane to facilitate heat conduction. In this way, heat generated by the LED chips could be conducted out quickly.

17 Claims, 3 Drawing Sheets

(52) U.S. Cl.
CPC ............... *G02F 1/133606* (2013.01); *G02F 2001/133628* (2013.01)

(56) References Cited

U.S. PATENT DOCUMENTS

| | | | | |
|---|---|---|---|---|
| 2012/0287606 | A1* | 11/2012 | Xiao | H01L 33/642 362/97.1 |
| 2015/0109775 | A1* | 4/2015 | Schwalenberg | F21K 9/61 362/231 |
| 2015/0377423 | A1* | 12/2015 | Lu | F21V 23/06 362/223 |
| 2018/0206411 | A1* | 7/2018 | Chen | H01L 33/502 |

FOREIGN PATENT DOCUMENTS

| | | |
|---|---|---|
| CN | 101140057 A | 3/2008 |
| CN | 201820786 U | 5/2011 |
| CN | 202110357 U | 1/2012 |
| CN | 202228982 U | 5/2012 |
| CN | 202351583 U | 7/2012 |
| CN | 102798060 A | 11/2012 |
| CN | 203242254 U | 10/2013 |
| CN | 203273503 U | 11/2013 |
| CN | 204756803 U | 11/2015 |
| CN | 205331917 U | 6/2016 |
| CN | 106200117 A | 12/2016 |

\* cited by examiner

100

LIGHT BAR, BACKLIGHT MODULE AND LIQUID CRYSTAL DISPLAY

CROSS-REFERENCE TO RELATED APPLICATIONS

The present application is a 35 U.S.C. § 371 National Phase conversion of International (PCT) Patent Application No. PCT/CN2017/112465 filed Nov. 23, 2017, which claims foreign priority of Chinese Patent Application No. 201710951922.4, filed on Oct. 12, 2017 in the State Intellectual Property Office of China, the contents of all of which are hereby incorporated by reference.

TECHNICAL FIELD

The present disclosure generally relates to display technology, and in particular relates to a light bar, a backlight module and a liquid crystal display.

BACKGROUND

Owing to the advantageous of having a thin body, power saving, no radiation etc., the liquid crystal display (LCD) has now been widely used. With the popularity of high power and highlight LCD, heat dissipation problem of LED lamp has been paid more attention and is considered as a design difficulty. When the LED lamp is used in an outdoor highlight display, the overall brightness of the display is required to be 2000 nits, even 3000 nits. In order to reduce manufacturing cost, the number of the LED lamps as backlight source cannot be too much. An LED lamp with power of 1.5 W-2 W is usually used as a backlight.

Please referring to FIG. 1, a temperature nephogram of the highlight display of the related art is shown. As shown in FIG. 1, the junction temperature of the LED is high, even the highest temperature could reach to 96° C. Please referring to FIGS. 2 and 3, FIG. 2 is a cross-sectional view of a straight down type backlight module according to the related art, FIG. 3 is a top view of the straight down type backlight module shown in FIG. 2. The straight down type backlight module 100 includes: a backplane 10, a PCB 20 arranged on the backplane 10, a glue layer 30 sandwiched between the backplane 10 and PCB 20, and a plurality of LED lamps 40 arranged on the PCB 20.

During the long term development, the inventors of the present application have found that in the backlight module of the related art, in the process of the heat generated by the LED lamps being conducted outside, thermal resistances include: a resistance of the LED package, a resistance of the PCB, a resistance of the glue layer, a resistance of the backplane, a resistance of a radiator and contact resistances. The heat generated by the plurality of LED lamps cannot be conducted out easily since the glue layer is a poor conductor of heat with extremely low thermal conductivity, and the backlight plane is made of metal steel that is poor in conduction, which would lead to a larger total thermal resistance.

SUMMARY

Embodiments of the present disclosure provide a light bar, a backlight module and an LCD, which could conduct heat out generated by the LED chip quickly.

In order to resolve the technical problem mentioned above, a technical scheme adopted by the present disclosure is to provide a light bar applied to a backlight module. The backlight module includes a backplane. The light bar includes a PCB and a plurality of LED chips arranged on a surface of the PCB. The other surface of the PCB is provided with a protrusion. The protrusion includes a convex bar or a plurality of convex columns and penetrates through the backplane to facilitate heat conduction.

In order to resolve the technical problem mentioned above, another technical scheme adopted by the present disclosure is to provide a backlight module including:

a light bar, including a PCB and a plurality of LED chips arranged on a surface of the PCB, the other surface of the PCB is provided with a protrusion;

a backplane, including a baseboard defining a through groove, the protrusion is inserted into the through groove to facilitate heat conduction.

In order to resolve the technical problem mentioned above, another technical scheme adopted by the present disclosure is to provide an LCD including a backlight module, the backlight module includes:

a light bar, including a PCB and a plurality of LED chips arranged on a surface of the PCB, the other surface of the PCB is provided with a protrusion;

a backplane, including a baseboard defining a through groove, wherein the protrusion is inserted into the through groove to facilitate heat conduction.

Compared with the related art, the backlight module of the present embodiment includes light bar and a backplane. The light bar includes a PCB and a plurality of LED chips arranged on a surface of the PCB, while the other surface of the PCB is provided with a protrusion. The backplane includes a baseboard defining a through groove. The protrusion is inserted into the through groove to facilitate heat conduction. The PCB of the present embodiment is provided with the protrusion on one surface thereof, the baseboard of the backplane defines a through groove, such that the protrusion could be inserted into the through groove, in this way, a majority of heat could be conducted out directly through the PCB, the heat conduction link of the backplane and the adhesive layer could be omitted, that is, thermal resistances of the adhesive layer and the backplane could be reduced, which could conduct heat generated by the LED chip out quickly, thereby improving the radiating effect of the backlight module.

BRIEF DESCRIPTION OF THE DRAWINGS

In order to illustrate the technical solution in the embodiments of the present disclosure more clearly, the accompanying drawings to be used in the description of the embodiments are briefly described below. It will be apparent that the accompanying drawings in the following description are merely embodiments of the present disclosure, other accompanying drawings may be obtained without creative work for those skilled in the art.

DETAILED DESCRIPTION

The technical solutions in the embodiments of the present disclosure will be clearly and completely described in connection with the drawings in the embodiments of the present disclosure. Obviously, the described embodiments are merely parts of the embodiments of the present disclosure, not all embodiments. Based on the embodiments in the present disclosure, all other embodiments can be obtained by those skilled in the art without making any creative work are within the scope of the protection of the present disclosure.

Figure 1:
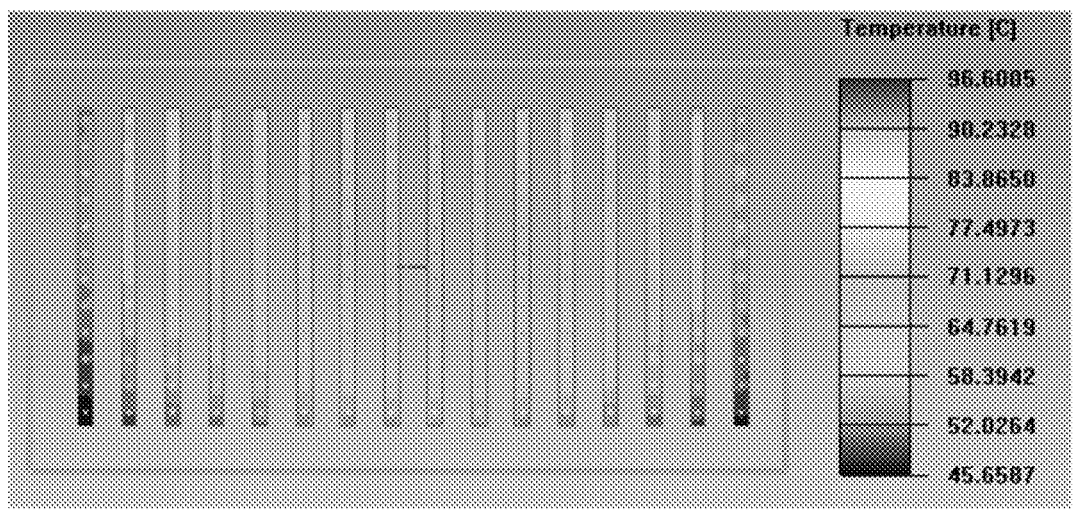
FIG. 1 is a temperature nephogram of a highlight display according to the related art.
Figure 2:
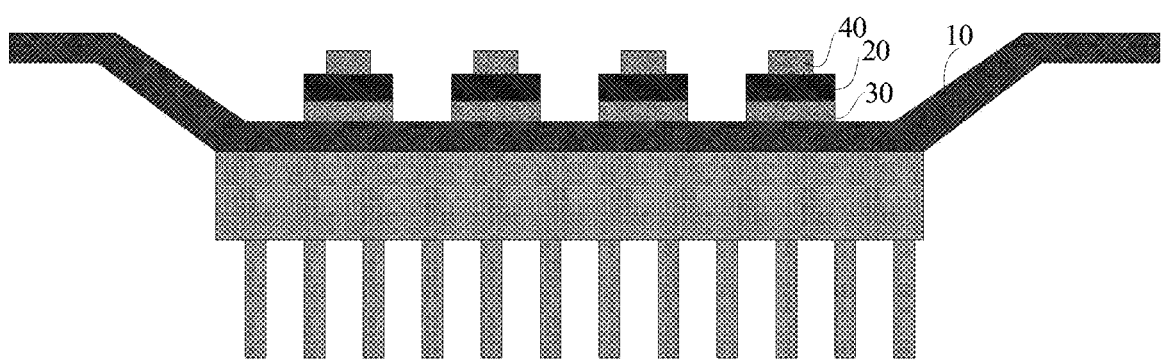
FIG. 2 is a cross-sectional view of a straight down type backlight module according to the related art.
Figure 3:
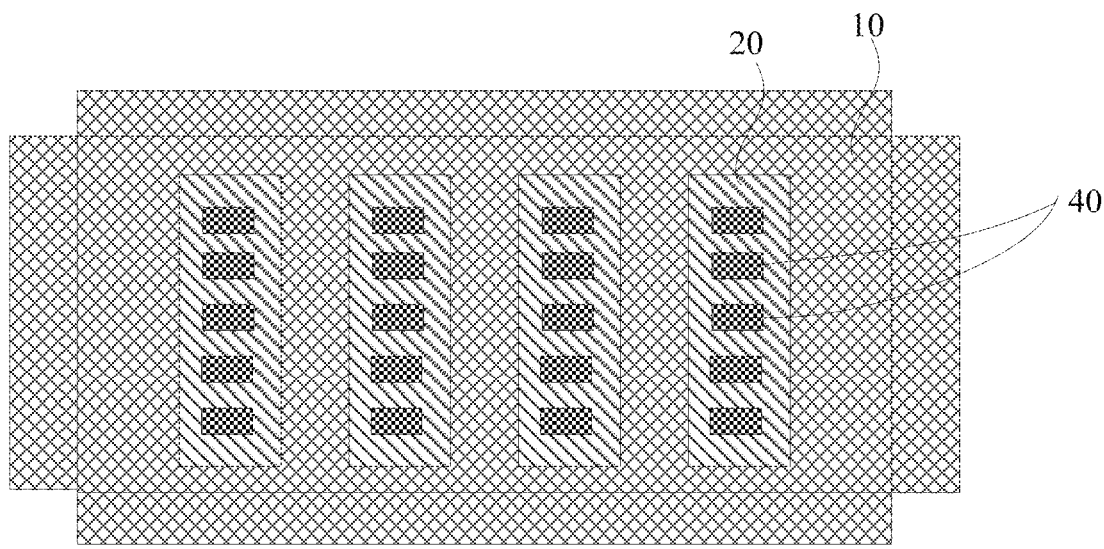
FIG. 3 is a top view of the straight down type backlight module shown in FIG. 2.
Figure 4:
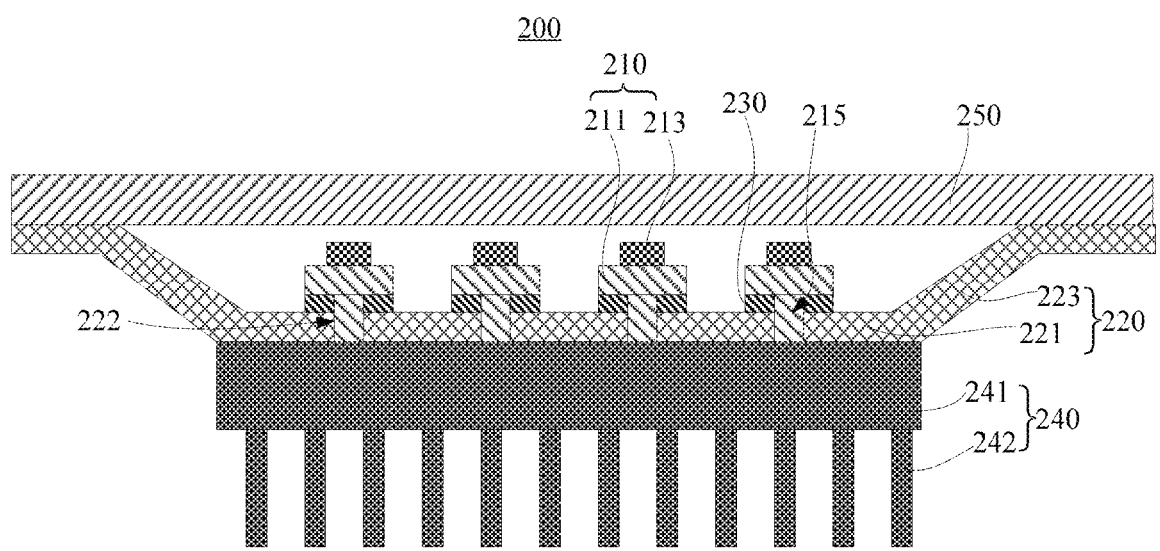
FIG. 4 is a cross-sectional view of a backlight module according to an embodiment of the present disclosure.
Figure 5:
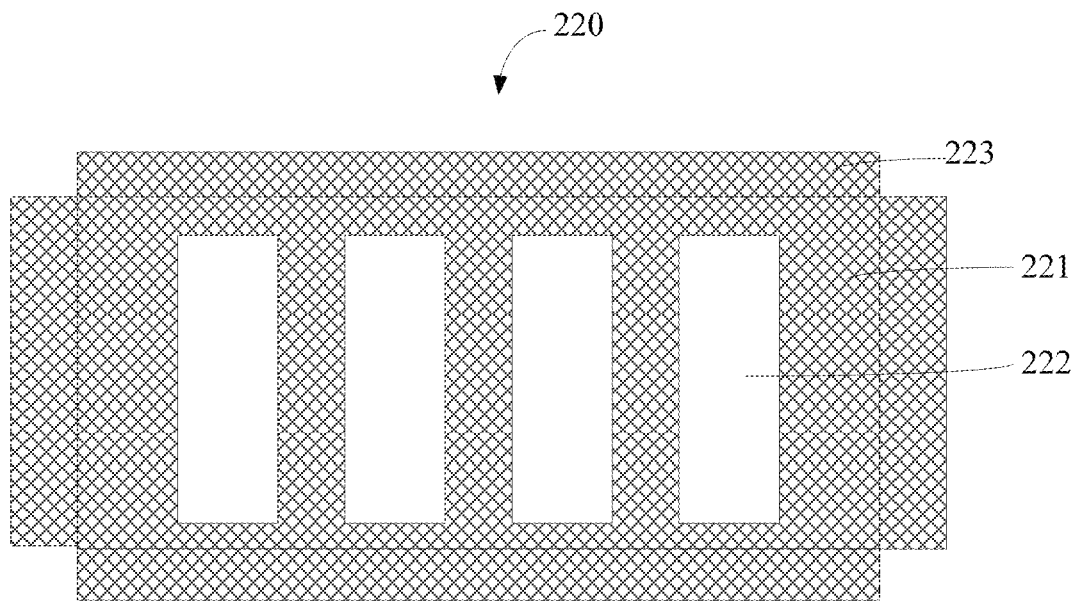
FIG. 5 is a top view of a backplane of the backlight module shown in FIG. 4.

Referring to FIG. 4, a cross-sectional view of a backlight module 200 according to an embodiment of the present disclosure is depicted. The backlight module 200 of the present embodiment may include light bars 210, a backplane 220, adhesive layers 230, a radiating module 240 and a diffuser plate 250.

Each light bar 210 may include a PCB 211, a plurality of LED chips 213 arranged on a surface of the PCB 211 and a protrusion 215 provided on the other surface of the PCB 211. The backplane 220 may include a baseboard 221 defining a plurality of through grooves 222. The protrusions 215 of the light bars 210 may be inserted into the plurality of through grooves 222 respectively to facilitate heat conduction.

In this embodiment, the PCB 211 may be an aluminum plate, the protrusion 215 may include a convex bar or a plurality of convex columns.

In the present embodiment, a cross section of the aluminum plate may have a T configuration. Alternatively, the cross section of the aluminum plate may have an inverted L configuration. In other embodiments, the cross section of the aluminum plate may have other configurations.

It is difficult to detect the temperature of the LED chip 213 since the LED chip 213 is wrapped by package structure (not shown). The LED chip 213 may be connected to lines of positive and negative electrodes, and the lines may extend to solder joints outside of the package structure, the temperature of which could be detected. Therefore, the temperature of the LED chip 213 can be calculated according to the following formula $Tj=T_{pad}+P*R1$. The LED chip 213 is very small in size. The junction temperature Tj may represent the temperature of the LED chip 213, the $T_{pad}$ may represent the average temperature of the positive and negative electrode pins (solder joints), the P may represent the power of the LED chip 213, and the R1 may represent the internal resistance of the package structure. The allowable junction temperature Tj of different power may usually be 120° C. According to the formula, it can be known that the higher the power of LED chip 213 is, the lower the allowable $T_{pad}$ is when the internal resistance of the package structure R1 and the junction temperature Tj remain unchanged.

In this embodiment, the through grooves 222 defined in the backplane 220 are configured to accommodate the protrusions 215 of the PCBs 211. In this way, on one hand, the PCBs 211 could be fixed on the backplane 220, on the other hand, the protrusions 215 of the PCBs 211 are inserted into the through grooves 222 and penetrate the backplane 220, which could omit the heat conduction link of backplane 220 and adhesive layer 230, that is, reduce the thermal resistances of adhesive layer 230 and backplane 220, which could conduct the heat generated by the LED chip 213 out quickly, thereby improving the radiating effect of the backlight module 200, reducing the $T_{pad}$, and further reducing the junction temperature.

Each adhesive layer 230 may be configured to stick the side edge of the protrusion 215 and the baseboard 221 together to make the connection between each PCB 211 and the backplane 220 stronger.

Alternatively, each adhesive layer 230 may be radiating glue, such that most heat generated by the LED chip 213 could be conducted out by the protrusion 215 of the PCB 211, another small part of the heat is conducted out by the PCB 211, the adhesive layer 230 and the baseboard 221 successively, which could further improve the radiating effect of the backlight module 200.

Alternatively, the adhesive layer 230 may be formed between the side edge of the protrusion 215 and the baseboard 211 by a manner of spraying or pasting.

Furthermore, the protrusion 215 may be fixed on the baseboard 221 by a manner of locking.

The radiating module 240 may be arranged on a surface of the backplane 220 away from the light bar 210, the protrusion 215 of the PCB 211 may contact with the radiating module 240 to radiate through the radiating module 240. The radiating module 240 may include a radiating base 241 adhered to the backplane 220 and a plurality of fins 242. The plurality of fins 242 may be arranged on a surface of the radiating base 241 away from the backplane 220 and spaced apart from each other.

Compared with the backlight module of the related art, the protrusion 215 of the PCB 211 of this embodiment contacts with the radiating module 240 directly, which could reduce the resistances of adhesive layer 230 and backplane 220 and conduct heat generated by the LED chip 213 to the radiating module 240 quickly, thereby improving the radiating effect of the backlight module 200.

The backplane 220 may further include a plurality of side plates 223 arranged around the edge of the baseboard 221. The diffuser plate 250 may be arranged above the plurality of LED chips 213, and fixed on the plurality of side plates 223.

The backlight module 200 may further include an optical film group (not shown). Light emitted by the LED chip 213 may firstly enter into the diffuser plate 250, and then enter into the optical film group to provide area light source with uniform illumination.

During assembly of the backlight module 200, the plurality of LED chips 213 may be firstly mounted on a surface of the PCB 211 to form the light bar 210. Then, the plurality of light bars 210 may be engaged in the through grooves 222 of the backplane 220 fixed on the radiating module 240 in turn. Finally, the diffuser plate 250 may be mounted above the LED chips 213 and fixed on the side plates 223 to form the backlight module 200.

Compared with the related art, the backlight module 200 of this embodiment includes light bars 210 and a backplane 220. Each light bar 210 includes a PCB 211 and a plurality of LED chips 213 arranged on a surface of the PCB 211, while the other surface of the PCB 211 is provided with a protrusion 215. The backplane 220 includes a baseboard 221 defining a plurality of through grooves 222. The protrusions 215 of the plurality of light bars 210 are inserted into the plurality of through grooves 222 respectively to facilitate heat conduction. The PCBs 211 of the present embodiment are provided with the protrusions 215 on one surface thereof, the baseboard 221 of the backplane 220 defines the plurality of through grooves 222, such that the protrusions 215 of the plurality of light bars 210 could be inserted into the plurality of through grooves 222 respectively, in this way, a majority of heat could be conducted out directly through the PCB 211, the heat conduction link of the backplane 220 and the adhesive layer 230 could be omitted, that is, thermal resistances of the adhesive layer 230 and the backplane 220 could be reduce, which could conduct heat generated by the LED chip 213 quickly, thereby improving the radiating effect of the backlight module 200.

Figure 6:
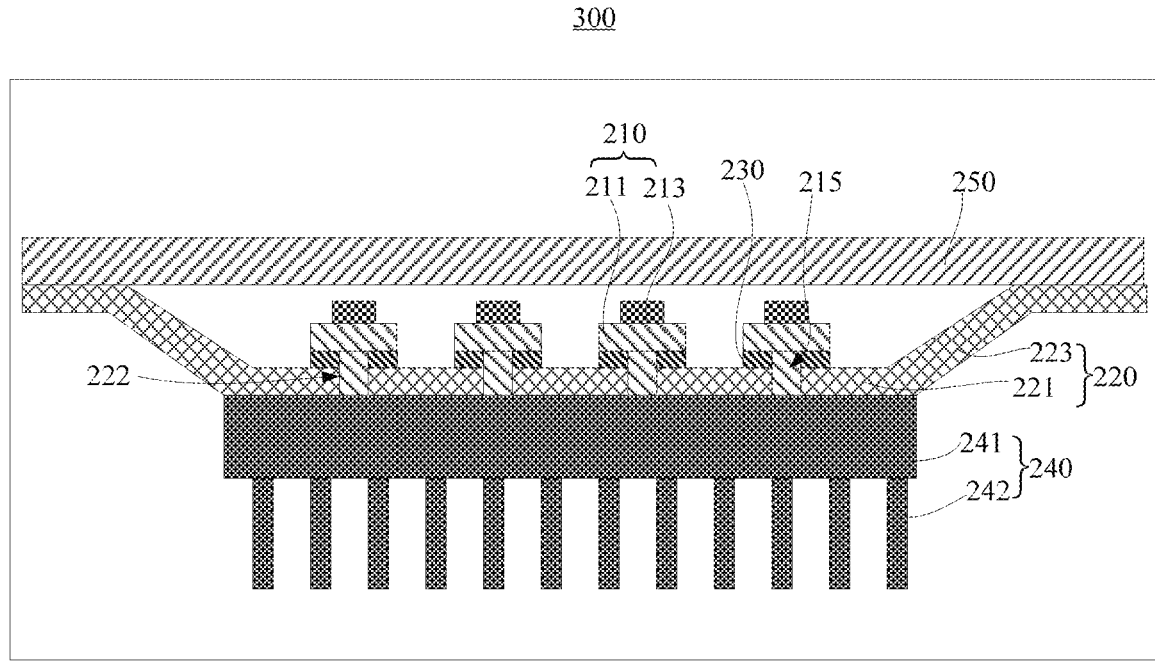
FIG. 6 is a schematic diagram of a liquid crystal display according to an embodiment of the present disclosure.

Referring to FIG. 6, an LCD 300 including the backlight module 200 aforementioned is provided, the details of which is not recited herein.

Compared with the related art, the LCD 300 of the present embodiment includes the aforementioned backlight module 200 including a light bar 210 and a backplane 220. The light bar 210 includes a PCB 211 and a plurality of LED chips 213 arranged on a surface of the PCB 211, while the other surface of the PCB 211 is provided with a protrusion 215. The backplane 220 includes a baseboard 221 defining a plurality of through grooves 222. The protrusions 215 of a plurality of light bars 210 are inserted into the plurality of through grooves 222 respectively to facilitate heat conduction. The PCB 211 of the present embodiment is provided with the protrusion 215 on one surface thereof, the baseboard 221 of the backplane 220 defines the plurality of through grooves 222, such that the protrusions 215 of the plurality of light bars 210 could be inserted into the plurality of through grooves 222 respectively, in this way, a majority of heat could be conducted out directly through the PCB 211, the heat conduction link of the backplane 220 and the adhesive layer 230 could be omitted, that is, thermal resistances of the adhesive layer 230 and the backplane 220 could be reduce, which could conduct heat generated by the LED chip 213 out quickly, thereby improving the radiating effect of the backlight module 200. Thus the service temperature of the LCD 300 could not be too high, so as to prolong the service life of the LCD 300.

The above description depicts merely some exemplary embodiments of the disclosure, but is meant to limit the scope of the disclosure. Any equivalent structure or flow transformations made to the disclosure, or any direct or indirect applications of the disclosure on other related fields, shall all be covered within the protection of the disclosure.

What is claimed is:

1. A backlight module, comprising:
a light bar, comprising a PCB defining first and second surfaces;
a plurality of LED chips arranged on said first surface of the PCB, whereby the second surface of the PCB comprises a protrusion;
a backplane, comprising a baseboard defining a through groove, wherein said protrusion of the PCB is inserted into the through groove to facilitate heat conduction.

2. The backlight module according to claim 1, wherein the backplane further comprises a plurality of side plates arranged around edges of the baseboard.

3. The backlight module according to claim 2, further comprising a diffuser plate arranged above the plurality of LED chips and fixed on the plurality of side plates.

4. The backlight module according to claim 1, wherein the PCB comprises an aluminum plate.

5. The backlight module according to claim 4, further comprising an adhesive layer configured to stick a side edge of the protrusion and the baseboard together to enhance the connection between the PCB and the backplane.

6. The backlight module according to claim 4, wherein a cross section of the aluminum plate has a T configuration.

7. The backlight module according to claim 1, further comprising a radiating module arranged on a surface of the backplane away from the light bar, the protrusion of the PCB contacts with the radiating module to conduct heat through the radiating module.

8. The backlight module according to claim 7, wherein the radiating module comprises a radiating base adhered to the backplane and a plurality of fins arranged at a surface of radiating base away from the backplane, the plurality of fins are spaced apart from each other.

9. The backlight module according to claim 1, wherein the protrusion comprises a convex bar or a plurality of convex columns.

10. A liquid crystal display (LCD), comprising a backlight module comprising:
a light bar, comprising a PCB, a plurality of LED chips arranged on a first surface of the PCB, a second surface of the PCB having a protrusion;
a backplane, comprising a baseboard defining a through groove, wherein the protrusion is inserted into the through groove to facilitate heat conduction.

11. The LCD according to claim 10, wherein the protrusion comprises a convex bar or a plurality of convex columns.

12. The LCD according to claim 11, wherein the backlight module further comprises an adhesive layer configured to stick a side edge of the protrusion and the baseboard together to enhance the connection between the PCB and the backplane.

13. The LCD according to claim 11, wherein a cross section of the aluminum plate has a T configuration.

14. The LCD according to claim 10, wherein the backlight module further comprises a radiating module arranged on a surface of the backplane away from the light bar, the protrusion of the PCB contacts with the radiating module to conduct heat through the radiating module.

15. The LCD according to claim 14, wherein the radiating module comprises a radiating base adhered to the backplane and a plurality of fins arranged at a surface of radiating base away from the backplane, the plurality of fins are spaced apart from each other.

16. The LCD according to claim 10, wherein the backplane further comprises a plurality of side plates arranged around edges of the baseboard.

17. The LCD according to claim 16, wherein the backlight module further comprises a diffuser plate arranged above the plurality of LED chips and fixed on the plurality of side plates.

* * * * *

UNITED STATES PATENT AND TRADEMARK OFFICE
CERTIFICATE OF CORRECTION

PATENT NO.       : 10,824,007 B2
APPLICATION NO.  : 15/740243
DATED            : November 3, 2020
INVENTOR(S)      : Jiaxin Li Page 1 of 1

It is certified that error appears in the above-identified patent and that said Letters Patent is hereby corrected as shown below:

On the Title Page

In (87) PCT Pub. No., delete "WO2018/071732" and insert in its place --WO2019/071732--

Signed and Sealed this
Fifth Day of January, 2021

Andrei Iancu
*Director of the United States Patent and Trademark Office*